No. 848,565. PATENTED MAR. 26, 1907.
J. McMULLIN.
PLOW.
APPLICATION FILED SEPT. 10, 1906.
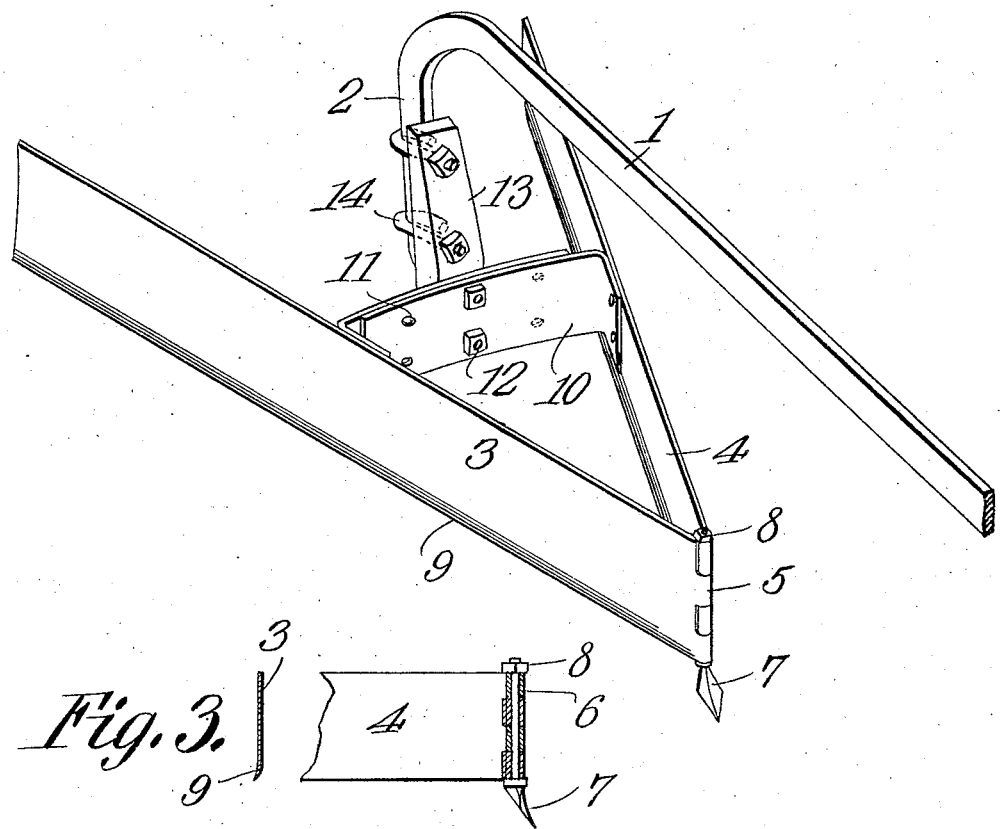
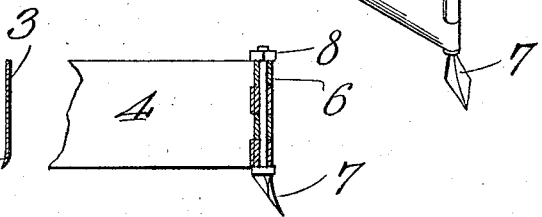
WITNESSES:
Joseph McMullin,
INVENTOR.
By C. A. Snow & Co.
ATTORNEYS

UNITED STATES PATENT OFFICE.

JOSEPH McMULLIN, OF CASEY, IOWA.

PLOW.

No. 848,565.   Specification of Letters Patent.   Patented March 26, 1907.

Application filed September 10, 1906. Serial No. 334,001.

*To all whom it may concern:*

Be it known that I, JOSEPH McMULLIN, a citizen of the United States, residing at Casey, in the county of Guthrie and State of Iowa, have invented a new and useful Plow, of which the following is a specification.

This invention relates to plows, and more particularly to devices of this character adapted for use between rows of corn, potatoes, &c.

The object of the invention is to provide an attachment which can be secured to the shank of an ordinary plow after the shovel of said plow has been detached and which can be drawn between rows, so as to remove weeds, &c., and to direct dirt upon the plants in the rows.

A still further object is to provide an attachment of this character which can be quickly adjusted for work between rows at different distances apart.

With the above and other objects in view the invention consists of certain novel features of construction and combinations of parts, which will be hereinafter more fully described, and pointed out in the claims.

In the accompanying drawings is shown the preferred form of the invention.

In said drawings, Figure 1 is a perspective view showing the attachment connected to the plow structure. Fig. 2 is a section through the front end of the attachment, and Fig. 3 is a transverse section through one of the blades of the attachment.

Referring to the figures by characters of reference, 1 is a plow-beam to the standard 2 of which the present attachment is adapted to be secured subsequent to the removal of the plow-shovel. The attachment consists of two elongated blades 3 and 4, hinged together at their forward ends, as shown at 5, upon a rod 6, having a small shovel 7 at its lower end, said rod being held in place by a nut 8, mounted on the upper threaded end of the rod. The blades have their lower edges outturned and sharpened, as shown at 9, and extending inward from each blade is a curved plate 10, concentric with the hinge 5. The plates 10 of the blades are adapted to overlap, and each plate has a series of apertures 11 therein, the apertures of the two plates being adapted to register so as to receive bolts 12, which serve to secure the plates to a shank 13. Any suitable means are provided for fastening the shank to the standard 2, said means preferably consisting of hooked bolts 14, which are adapted to embrace and clamp upon the standard.

The herein-described attachment is designed for use in lieu of the ordinary two-shoveled plow, such as usually employed for plowing between the rows. It possesses advantages over such a plow, however, in view of the fact that the same is adjustable to different widths, covers a greater area than a two-shoveled plow, and does not disturb the roots of the growing crop. By employing the small shovel 7 at the hinge 5 a shallow furrow is plowed between the rows and the blades carry the loosened dirt up to the rows. The plates 10 not only serve to hold the blades at desired angles to each other, but also constitute a means for facilitating the proper securing of the attachment to the standard of a plow.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the claims.

What is claimed is—

1. A plow attachment comprising a shovel, a rod extending therefrom, blades hinged upon the rod and extending at angles to each other, and means for adjustably securing the blades at desired angles.

2. A plow attachment comprising a shovel, a rod extending therefrom, blades hinged upon the rod and extending at angles to each other, said blades having their lower edges outturned and sharpened, curved plates secured to the blades and normally overlapping, a shank, and means extending through the shank and plates for securing the shank to the plates and locking said plates in adjusted position.

In testimony that I claim the foregoing as my own I have hereto affixed my signature in the presence of two witnesses.

JOSEPH McMULLIN.

Witnesses:
G. W. RUTT,
M. I. JONES.